US012363487B2

(12) United States Patent
Guo et al.

(10) Patent No.: US 12,363,487 B2
(45) Date of Patent: Jul. 15, 2025

(54) HEARING DEVICE COMPRISING A FEEDBACK CONTROL SYSTEM

(71) Applicant: Oticon A/S, Smørum (DK)

(72) Inventors: Meng Guo, Smørum (DK); Jesper Jensen, Smørum (DK)

(73) Assignee: Oticon A/S, Smørum (DK)

( * ) Notice: Subject to any disclaimer, the term of this patent is extended or adjusted under 35 U.S.C. 154(b) by 13 days.

(21) Appl. No.: 17/881,077

(22) Filed: Aug. 4, 2022

(65) Prior Publication Data

US 2023/0044509 A1 Feb. 9, 2023

(30) Foreign Application Priority Data

Aug. 5, 2021 (EP) .................................... 21189763

(51) Int. Cl.
*H04R 25/00* (2006.01)

(52) U.S. Cl.
CPC .................................. *H04R 25/453* (2013.01)

(58) Field of Classification Search
CPC ............... H04R 25/507; H04R 25/453; H04R 2225/43; H04R 2225/41; H04R 2460/01; H04R 25/00
USPC .......................................... 381/317, 312, 318
See application file for complete search history.

(56) References Cited

U.S. PATENT DOCUMENTS

2012/0288107 A1* 11/2012 Lamm .................... H04R 25/30 381/59
2017/0311095 A1* 10/2017 Fitz ...................... H04R 25/453
2018/0041846 A1 2/2018 Puder et al.
2020/0053486 A1* 2/2020 Jensen ................. H04R 25/505

FOREIGN PATENT DOCUMENTS

EP 2981099 A2 2/2016
EP 2981099 A3 3/2016
EP 3139636 A1 3/2017
EP 3236675 A1 10/2017
(Continued)

OTHER PUBLICATIONS

Search Report issued in European priority application 21189763.2, dated Jan. 31, 2022.

*Primary Examiner* — Norman Yu
(74) *Attorney, Agent, or Firm* — Birch, Stewart, Kolasch & Birch, LLP

(57) ABSTRACT

A hearing aid comprises a) at least one input transducer for providing at least one electric input signal representing said sound; b) an output transducer for providing stimuli perceivable to the user as sound; c) a feedback control system configured to minimize feedback from said output transducer to said at least one input transducer, and to at least provide a feedback corrected version of said at least one electric input signal; and d) an audio signal processor configured to apply one or more processing algorithms to said feedback corrected version of said at least one electric input signal, and to provide a processed signal in dependence thereof. The feedback control system is based on a machine learning model receiving input data at least representing said at least one electric input signal; and said processed signal; and providing said feedback corrected version of the at least one electric input signal as an output. A method of training a machine learning model is further disclosed.

20 Claims, 12 Drawing Sheets

(56) References Cited

FOREIGN PATENT DOCUMENTS

| | | | |
|---|---|---|---|
| EP | 3291581 | A2 | 3/2018 |
| EP | 3598777 | A2 | 1/2020 |
| EP | 3598777 | A3 | 4/2020 |
| KR | 10-2130505 | B1 | 7/2020 |

* cited by examiner

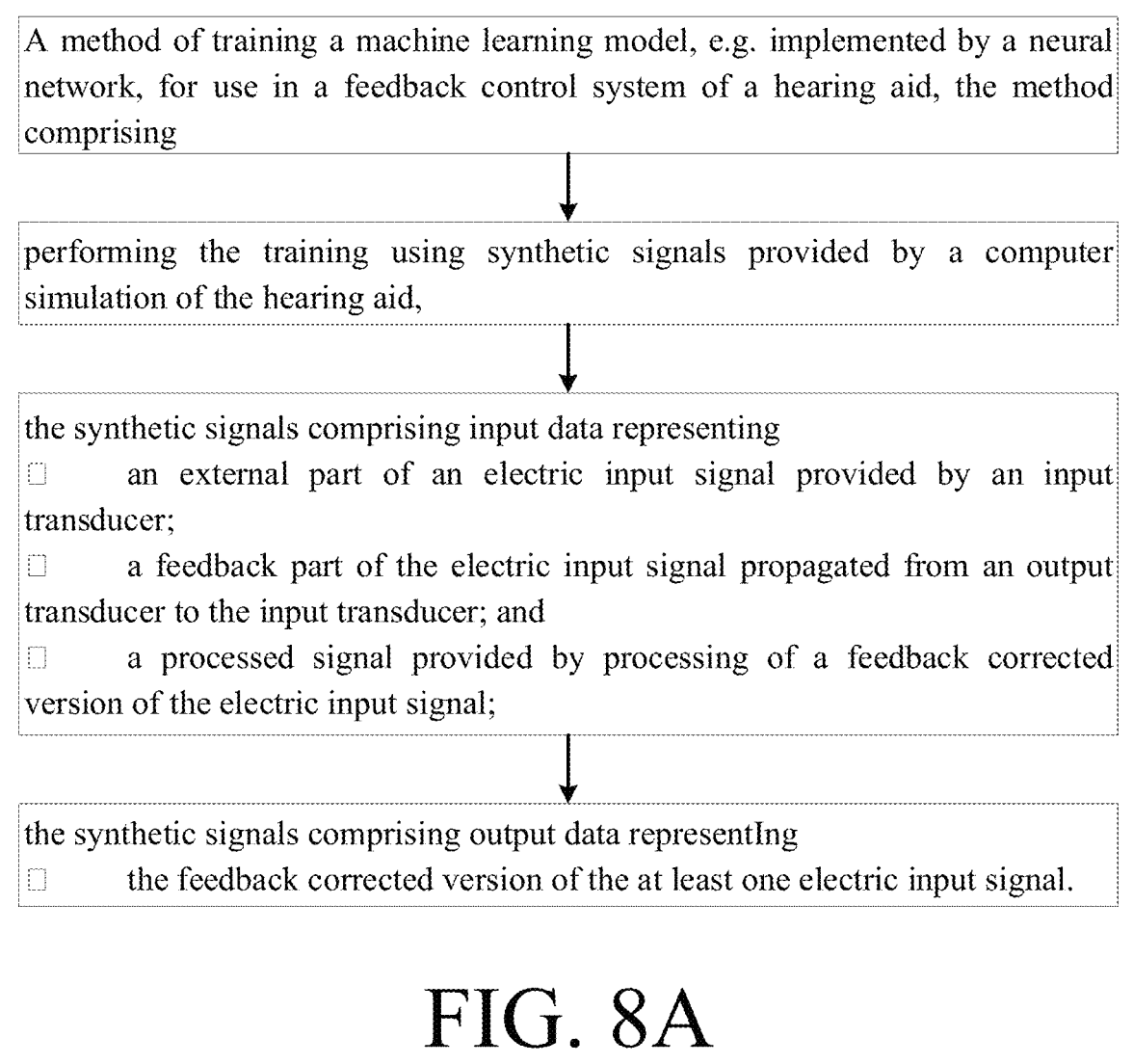

A method of training a machine learning model, e.g. implemented by a neural network, for use in a feedback control system of a hearing aid, the method comprising

↓ performing the training using synthetic signals provided by a computer simulation of the hearing aid,

↓ the synthetic signals comprising input data representing

- an external part of an electric input signal provided by an input transducer;
- a feedback part of the electric input signal propagated from an output transducer to the input transducer; and
- a processed signal provided by processing of a feedback corrected version of the electric input signal;

↓ the synthetic signals comprising output data representIng

- the feedback corrected version of the at least one electric input signal.

FIG. 8A

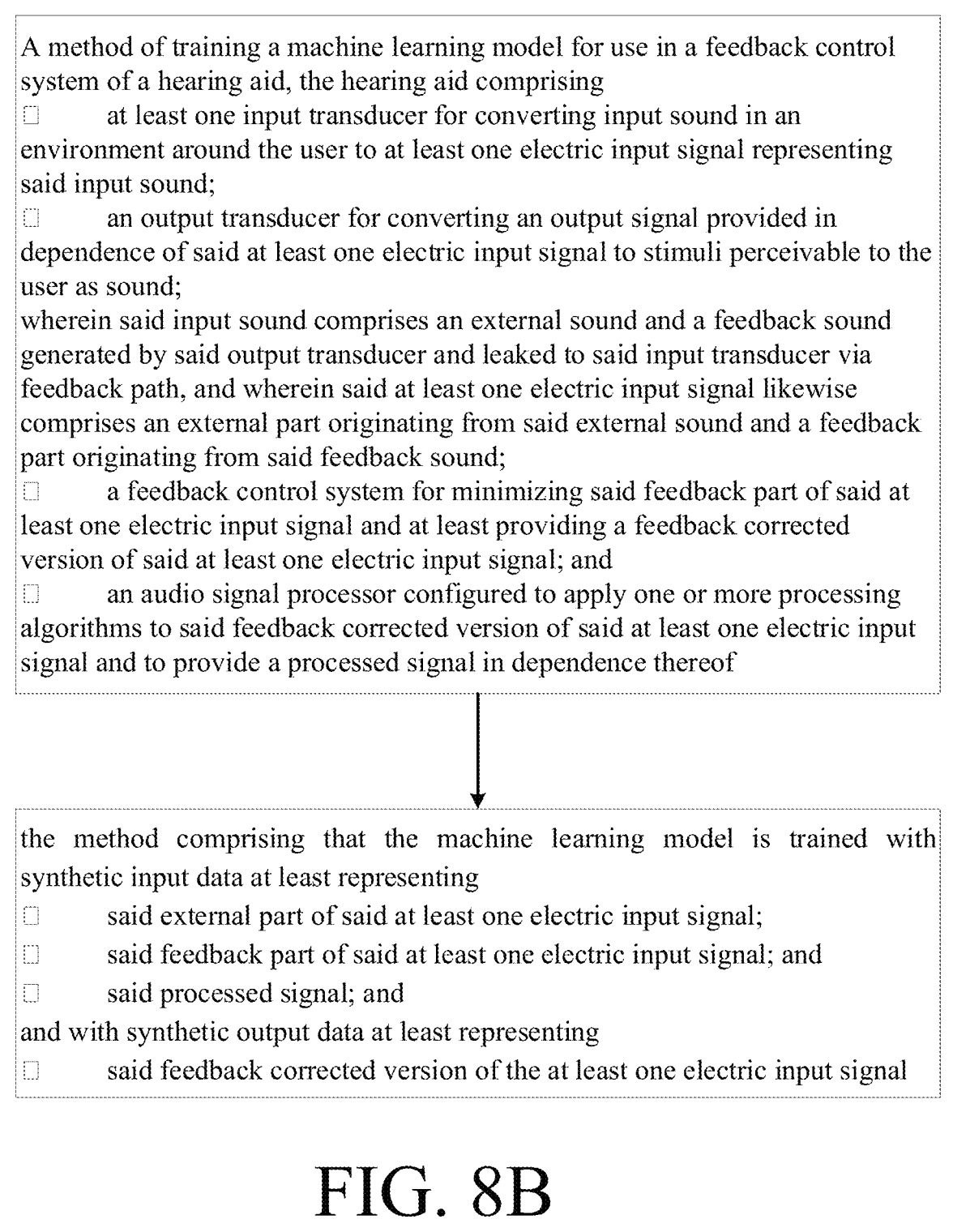

A method of training a machine learning model for use in a feedback control system of a hearing aid, the hearing aid comprising

- at least one input transducer for converting input sound in an environment around the user to at least one electric input signal representing said input sound;
- an output transducer for converting an output signal provided in dependence of said at least one electric input signal to stimuli perceivable to the user as sound;

wherein said input sound comprises an external sound and a feedback sound generated by said output transducer and leaked to said input transducer via feedback path, and wherein said at least one electric input signal likewise comprises an external part originating from said external sound and a feedback part originating from said feedback sound;

- a feedback control system for minimizing said feedback part of said at least one electric input signal and at least providing a feedback corrected version of said at least one electric input signal; and
- an audio signal processor configured to apply one or more processing algorithms to said feedback corrected version of said at least one electric input signal and to provide a processed signal in dependence thereof

↓ the method comprising that the machine learning model is trained with synthetic input data at least representing

- said external part of said at least one electric input signal;
- said feedback part of said at least one electric input signal; and
- said processed signal; and and with synthetic output data at least representing

- said feedback corrected version of the at least one electric input signal

FIG. 8B

HEARING DEVICE COMPRISING A FEEDBACK CONTROL SYSTEM

TECHNICAL FIELD

The present disclosure deals with hearing devices, e.g. hearing aids, in particular with feedback control.

Feedback control systems in modern hearing devices are generally efficient to ensure system stability and to provide the necessary gain to the users, at the same time they enable high-quality output sounds, especially for speech.

However, there are still situations where the feedback can impose stability issues, where a lower-than-needed gain must then be presented to the user leading to poor sound perception. Moreover, feedback control systems have still some difficulties to always enable a high-quality output sound to satisfy all users, especially for musicians and "super users" who are sensitive to even minor sound distortions.

Until now, NLMS based systems have been used for feedback cancellation, although being efficient in many situations they suffer the so-called biased estimation problem. State-of-the-art methods to solve this biased estimation problem need to introduce some minor modifications to the hearing aid output signals, e.g., frequency shift and/or probe noise based methods, which in turn can affect perceived sound quality, especially for musical sounds and some high-pitched voices. Furthermore, the NLMS based systems have (unsolvable) limitations in how fast they can react to and handle critical feedback situations, this limits how much gain the hearing aid can provide to avoid feedback, and to support an open fitting for better comfort.

SUMMARY

NLMS based feedback control systems are reaching their full potentials, and a completely new generation of feedback control is needed to unlock the next performance level.

Modern machine learning techniques provide a new tool, which may deliver a completely new generation of feedback control systems, which can solve the biased estimation problem without compromising sound quality, and it can better handle critical feedback situations and hence better ensure that the optimal gain can be provided to the users.

EP3236675B1 deals with methods for neural network-driven feedback cancellation for hearing assistance devices. Various embodiments include a method of signal processing an input signal in a hearing assistance device to mitigate entrainment, the hearing assistance device including a receiver and a microphone. The method includes training a neural network to identify acoustic features in a plurality of example system inputs and predict target outputs for the plurality of example system inputs; and using the trained neural network to predict an output for the input signal and to use the output to govern adaptive behaviour of the adaptive feedback canceller.

The present application relates to the use of machine learning or artificial intelligence methods, e.g. utilizing neural networks and e.g. supervised learning, in the task of providing improvements in feedback control or echo cancelling in a hearing device, e.g. a hearing aid or a headset.

A Hearing Aid:

In an aspect of the present application, a hearing aid adapted for being worn by a user at or in an ear of the user is provided. The hearing aid comprises

- at least one input transducer for converting sound in an environment around the user to at least one electric input signal representing said sound;
- an output transducer for converting an output signal provided in dependence of said least one electric input signal to stimuli perceivable to the user as sound;
- a feedback control system configured
  - to minimize feedback from said output transducer to said at least one input transducer, and
  - to at least provide a feedback corrected version of said at least one electric input signal; and
- an audio signal processor configured
  - to apply one or more processing algorithms to said feedback corrected version of said at least one electric input signal, and
  - to provide a processed signal in dependence thereof.

The feedback control system may be based on a machine learning model receiving input data at least representing

- said at least one electric input signal; and
- said processed signal.

The feedback control system may be configured to provide said feedback corrected version of the at least one electric input signal as an output.

Thereby an improved hearing aid may be provided.

The machine learning model may be configured to provide (as an output) data representing the feedback and/or the feedback corrected version of the at least one electric input signal as an output. The data representing the feedback corrected version of the at least one electric input signal may be used directly by the processor. The feedback control system or the audio signal processor may be configured to provide that the feedback corrected version of the at least one electric input signal is extracted or estimated from the data representing the feedback corrected version of the at least one electric input signal. The data representing the feedback may e.g. be an estimate of the feedback path transfer function/impulse response. This can e.g. be used to filter the output signal (input signal to the output transducer, e.g. a loudspeaker input signal) to produce an estimate of the feedback signal, which may then be subtracted from the input signal to perform feedback reduction.

The feedback control system may be configured to provide said output signal as a further output. The machine learning model may be configured to provide output data representing the output signal. The data representing the output signal may be used directly by the output transducer. The feedback control system or the output transducer (or an intermediate unit) may be configured to provide that the output signal is extracted or estimated from the data representing the output signal.

The machine learning model may be configured to receive further input data representing information about said one or more processing algorithms. The one or more processing algorithms may e.g. include a noise reduction algorithm (e.g. related to beamforming and/or post-filtering), a compression algorithm for compensating for the user's hearing impairment (e.g. related to providing a frequency and level dependent gain), a transform-domain algorithm, e.g. a frequency domain transform algorithm (e.g. to allow processing in a transform domain, e.g. in a number of frequency bands), etc. Information about the one or more processing algorithms may e.g. include attenuation values and criteria for applying them (noise reduction), gains, knee points, compression ratios, etc. (compression), number of 'bands' (transform domain), etc.

The feedback control system may be configured to provide a control input signal to the audio signal processor as a further output, said control input signal comprising parameters providing inputs to said one or more processing algorithms. The machine learning model may be configured to provide output data representing the control input signal to the audio signal processor. The feedback control system or the audio signal processor may be configured to provide that the parameters are extracted or estimated from the data representing the control input signal to the audio signal processor. The parameters may e.g. include one or more parameters related to the hearing aid processing, such as loop magnitude (identical to loop gain), current sound environment, loop phase, loop delay, feedback dynamics (steady vs. quickly changing over time, such information/parameter can be used to control the compression/gain/beamformer/noise control behavior), etc. The mentioned parameters may be trained together with the general training of the feedback control system.

The machine learning model may be trained with input data at least representing the at least one electric input signal and the processed signal.

The machine learning model may be trained with further input data representing information about the one or more processing algorithms. Some examples are:

- input analog-to-digital conversion algorithm(s)
- output digital-to-analog conversion algorithm(s)
- beamformer algorithm(s)
- noise reductions algorithm(s)
- hearing loss compensation—compression algorithm(s)
- environment detection algorithm(s)

The machine learning model may be trained with synthetic input data at least representing

- said external part of said at least one electric input signal;
- said feedback part of said at least one electric input signal; and
- said processed signal; and with synthetic output data at least representing

- said feedback corrected version of the at least one electric input signal.

The processed signal from the processor may provide (e.g. comprise or constitute) the output signal (to the output transducer).

The hearing aid may be constituted by or comprise an air-conduction type hearing aid, a bone-conduction type hearing aid, or a combination thereof.

The hearing aid may comprise at least one analysis filter bank for providing the at least one electric input signal in a time-frequency domain representation. Thereby signal processing of the forward audio path from the at least one input transducer to the output transducer may be performed in the time-frequency domain (k,l), where l is a time (frame) index and k is a frequency index. The analysis filter bank may comprise a Fourier transform algorithm, e.g. a Short Time Fourier Transform (STFT) algorithm.

The input data to the machine learning model may e.g. be representative of

- the at least one electric input signal; and
- the processed signal, which for each time index l each are arranged as a vector with K elements, K being the number of frequency bands in the time-frequency domain representation (k,l) (see e.g. FIG. 7A, 7B).

Input data to the machine learning model may each be arranged as concatenated K-element (column) vectors over several (L) time indices $l=l'-L+1, \ldots, l'$ (see e.g. FIG. 7D).

The hearing aid may be adapted to provide a frequency dependent gain and/or a level dependent compression and/or a transposition (with or without frequency compression) of one or more frequency ranges to one or more other frequency ranges, e.g. to compensate for a hearing impairment of a user. The hearing aid may comprise a signal processor for enhancing the input signals and providing a processed output signal.

The hearing aid may comprise an output unit for providing a stimulus perceived by the user as an acoustic signal based on a processed electric signal. The output unit may comprise a vibrator of a bone conducting hearing aid. The output unit may comprise an output transducer. The output transducer may comprise a receiver (loudspeaker) for providing the stimulus as an acoustic signal to the user (e.g. in an acoustic (air conduction based) hearing aid). The output transducer may comprise a vibrator for providing the stimulus as mechanical vibration of a skull bone to the user (e.g. in a bone-attached or bone-anchored hearing aid). The output unit may (additionally or alternatively) comprise a transmitter for transmitting sound picked up-by the hearing aid to another device, e.g. a far-end communication partner (e.g. via a network, e.g. in a telephone mode of operation, or in a headset configuration).

The hearing aid may comprise an input unit for providing an electric input signal representing sound. The input unit may comprise an input transducer, e.g. a microphone, for converting an input sound to an electric input signal. The input unit may comprise a wireless receiver for receiving a wireless signal comprising or representing sound and for providing an electric input signal representing said sound. The wireless receiver may e.g. be configured to receive an electromagnetic signal in the radio frequency range (3 kHz to 300 GHz). The wireless receiver may e.g. be configured to receive an electromagnetic signal in a frequency range of light (e.g. infrared light 300 GHz to 430 THz, or visible light, e.g. 430 THz to 770 THz).

The hearing aid may comprise a directional microphone system adapted to spatially filter sounds from the environment, and thereby enhance a target acoustic source among a multitude of acoustic sources in the local environment of the user wearing the hearing aid. The directional system may be adapted to detect (such as adaptively detect) from which direction a particular part of the microphone signal originates. This can be achieved in various different ways as e.g. described in the prior art. In hearing aids, a microphone array beamformer is often used for spatially attenuating background noise sources. Many beamformer variants can be found in literature. The minimum variance distortionless response (MVDR) beamformer is widely used in microphone array signal processing. Ideally the MVDR beamformer keeps the signals from the target direction (also referred to as the look direction) unchanged, while attenuating sound signals from other directions maximally. The generalized sidelobe canceller (GSC) structure is an equivalent representation of the MVDR beamformer offering computational and numerical advantages over a direct implementation in its original form.

The hearing aid may comprise antenna and transceiver circuitry allowing a wireless link to an entertainment device (e.g. a TV-set), a communication device (e.g. a telephone), a wireless microphone, or another hearing aid, etc. The hearing aid may thus be configured to wirelessly receive a direct electric input signal from another device. Likewise, the hearing aid may be configured to wirelessly transmit a direct electric output signal to another device. The direct electric input or output signal may represent or comprise an audio signal and/or a control signal and/or an information signal.

In general, a wireless link established by antenna and transceiver circuitry of the hearing aid can be of any type. The wireless link may be a link based on near-field communication, e.g. an inductive link based on an inductive coupling between antenna coils of transmitter and receiver parts. The wireless link may be based on far-field, electromagnetic radiation. Preferably, frequencies used to establish a communication link between the hearing aid and the other device is below 70 GHz, e.g. located in a range from 50 MHz to 70 GHz, e.g. above 300 MHz, e.g. in an ISM range above 300 MHz, e.g. in the 900 MHz range or in the 2.4 GHz range or in the 5.8 GHz range or in the 60 GHz range (ISM=Industrial, Scientific and Medical, such standardized ranges being e.g. defined by the International Telecommunication Union, ITU). The wireless link may be based on a standardized or proprietary technology. The wireless link may be based on Bluetooth technology (e.g. Bluetooth Low-Energy technology), or Ultra WideBand (UWB) technology.

The hearing aid may be or form part of a portable (i.e. configured to be wearable) device, e.g. a device comprising a local energy source, e.g. a battery, e.g. a rechargeable battery. The hearing aid may e.g. be a low weight, easily wearable, device, e.g. having a total weight less than 100 g, such as less than 20 g, e.g. less than 5 g.

The hearing aid may comprise a 'forward' (or 'signal') path for processing an audio signal between an input and an output of the hearing aid. A signal processor may be located in the forward path. The signal processor may be adapted to provide a frequency dependent gain according to a user's particular needs (e.g. hearing impairment). The hearing aid may comprise an 'analysis' path comprising functional components for analyzing signals and/or controlling processing of the forward path. Some or all signal processing of the analysis path and/or the forward path may be conducted in the frequency domain, in which case the hearing aid comprises appropriate analysis and synthesis filter banks. Some or all signal processing of the analysis path and/or the forward path may be conducted in the time domain.

An analogue electric signal representing an acoustic signal may be converted to a digital audio signal in an analogue-to-digital (AD) conversion process, where the analogue signal is sampled with a predefined sampling frequency or rate $f_s$, $f_s$ being e.g. in the range from 8 kHz to 48 kHz (adapted to the particular needs of the application) to provide digital samples $x_n$ (or x[n]) at discrete points in time $t_n$ (or n), each audio sample representing the value of the acoustic signal at $t_n$ by a predefined number $N_b$ of bits, $N_b$ being e.g. in the range from 1 to 48 bits, e.g. 24 bits. Each audio sample is hence quantized using $N_b$ bits (resulting in $2^{Nb}$ different possible values of the audio sample). A digital sample x has a length in time of $1/f_s$, e.g. 50 μs, for $f_s$=20 kHz. A number of audio samples may be arranged in a time frame. A time frame may comprise 64 or 128 audio data samples. Other frame lengths may be used depending on the practical application.

The hearing aid may comprise an analogue-to-digital (AD) converter to digitize an analogue input (e.g. from an input transducer, such as a microphone) with a predefined sampling rate, e.g. 20 kHz. The hearing aids may comprise a digital-to-analogue (DA) converter to convert a digital signal to an analogue output signal, e.g. for being presented to a user via an output transducer.

The hearing aid, e.g. the input unit, and or the antenna and transceiver circuitry may comprise a transform unit for converting a time domain signal to a signal in the transform domain (e g frequency domain or Laplace domain, etc.). The transform unit may be constituted by or comprise a TF-conversion unit for providing a time-frequency representation of an input signal. The time-frequency representation may comprise an array or map of corresponding complex or real values of the signal in question in a particular time and frequency range. The TF conversion unit may comprise a filter bank for filtering a (time varying) input signal and providing a number of (time varying) output signals each comprising a distinct frequency range of the input signal. The TF conversion unit may comprise a Fourier transformation unit (e.g. a Discrete Fourier Transform (DFT) algorithm, or a Short Time Fourier Transform (STFT) algorithm, or similar) for converting a time variant input signal to a (time variant) signal in the (time-)frequency domain. The frequency range considered by the hearing aid from a minimum frequency $f_{min}$ to a maximum frequency $f_{max}$ may comprise a part of the typical human audible frequency range from 20 Hz to 20 kHz, e.g. a part of the range from 20 Hz to 12 kHz. Typically, a sample rate $f_s$ is larger than or equal to twice the maximum frequency $f_{max}$, $f_s \geq 2f_{max}$. A signal of the forward and/or analysis path of the hearing aid may be split into a number NI of frequency bands (e.g. of uniform width), where NI is e.g. larger than 5, such as larger than 10, such as larger than 50, such as larger than 100, such as larger than 500, at least some of which are processed individually. The hearing aid may be adapted to process a signal of the forward and/or analysis path in a number NP of different frequency channels (NP≤NI). The frequency channels may be uniform or non-uniform in width (e.g. increasing in width with frequency), overlapping or non-overlapping.

The hearing aid may be configured to operate in different modes, e.g. a normal mode and one or more specific modes, e.g. selectable by a user, or automatically selectable. A mode of operation may be optimized to a specific acoustic situation or environment. A mode of operation may include a low-power mode, where functionality of the hearing aid is reduced (e.g. to save power), e.g. to disable wireless communication, and/or to disable specific features of the hearing aid.

The hearing aid may comprise a number of detectors configured to provide status signals relating to a current physical environment of the hearing aid (e.g. the current acoustic environment), and/or to a current state of the user wearing the hearing aid, and/or to a current state or mode of operation of the hearing aid. Alternatively or additionally, one or more detectors may form part of an external device in communication (e.g. wirelessly) with the hearing aid. An external device may e.g. comprise another hearing aid, a remote control, and audio delivery device, a telephone (e.g. a smartphone), an external sensor, etc.

One or more of the number of detectors may operate on the full band signal (time domain) One or more of the number of detectors may operate on band split signals ((time-) frequency domain), e.g. in a limited number of frequency bands.

The number of detectors may comprise a level detector for estimating a current level of a signal of the forward path. The detector may be configured to decide whether the current level of a signal of the forward path is above or below a given (L-)threshold value. The level detector operates on the full band signal (time domain). The level detector operates on band split signals ((time-) frequency domain).

The hearing aid may comprise a voice activity detector (VAD) for estimating whether or not (or with what probability) an input signal comprises a voice signal (at a given point in time). A voice signal may in the present context be taken to include a speech signal from a human being. It may also include other forms of utterances generated by the human speech system (e.g. singing). The voice activity detector unit may be adapted to classify a current acoustic environment of the user as a VOICE or NO-VOICE environment. This has the advantage that time segments of the electric microphone signal comprising human utterances (e.g. speech) in the user's environment can be identified, and thus separated from time segments only (or mainly) comprising other sound sources (e.g. artificially generated noise). The voice activity detector may be adapted to detect as a VOICE also the user's own voice. Alternatively, the voice activity detector may be adapted to exclude a user's own voice from the detection of a VOICE.

The hearing aid may comprise an own voice detector for estimating whether or not (or with what probability) a given input sound (e.g. a voice, e.g. speech) originates from the voice of the user of the system. A microphone system of the hearing aid may be adapted to be able to differentiate between a user's own voice and another person's voice and possibly from NON-voice sounds.

The number of detectors may comprise a movement detector, e.g. an acceleration sensor. The movement detector may be configured to detect movement of the user's facial muscles and/or bones, e.g. due to speech or chewing (e.g. jaw movement) and to provide a detector signal indicative thereof.

The hearing aid may comprise a classification unit configured to classify the current situation based on input signals from (at least some of) the detectors, and possibly other inputs as well. In the present context 'a current situation' may be taken to be defined by one or more of a) the physical environment (e.g. including the current electromagnetic environment, e.g. the occurrence of electromagnetic signals (e.g. comprising audio and/or control signals) intended or not intended for reception by the hearing aid, or other properties of the current environment than acoustic);
b) the current acoustic situation (input level, feedback, etc.), and
c) the current mode or state of the user (movement, temperature, cognitive load, etc.);
d) the current mode or state of the hearing aid (program selected, time elapsed since last user interaction, etc.) and/or of another device in communication with the hearing aid.

The classification unit may be based on or comprise a neural network, e.g. a trained neural network.

The hearing aid may further comprise other relevant functionality for the application in question, e.g. compression, noise reduction, etc.

The hearing aid may comprise a hearing instrument, e.g. a hearing instrument adapted for being located at the ear or fully or partially in the ear canal of a user, e.g. a headset, an earphone, an ear protection device or a combination thereof. A hearing system may comprise a speakerphone (comprising a number of input transducers and a number of output transducers, e.g. for use in an audio conference situation), e.g. comprising a beamformer filtering unit, e.g. providing multiple beamforming capabilities.

Use:

In an aspect, use of a hearing aid as described above, in the 'detailed description of embodiments' and in the claims, is moreover provided. Use may be provided in a system comprising one or more hearing aids (e.g. hearing instruments), headsets, ear phones, active ear protection systems, etc., e.g. in handsfree telephone systems, teleconferencing systems (e.g. including a speakerphone), public address systems, karaoke systems, classroom amplification systems, etc.

A Method for Training a Machine Learning Model:

In an aspect, a method of training a machine learning model for use in a feedback control system of a hearing aid is furthermore provided by the present application. The hearing aid comprises at least one input transducer for converting input sound in an environment around the user to at least one electric input signal representing said input sound;
an output transducer for converting an output signal provided in dependence of said at least one electric input signal to stimuli perceivable to the user as sound;

wherein said input sound comprises an external sound and a feedback sound (the latter being) generated by said output transducer and leaked to said input transducer via a feedback path, and wherein said at least one electric input signal likewise comprises an external part originating from said external sound and a feedback part originating from said feedback sound.

The hearing aid may further comprise a feedback control system for minimizing said feedback part of said at least one electric input signal and at least providing a feedback corrected version of said at least one electric input signal; and
an audio signal processor configured to apply one or more processing algorithms to said feedback corrected version of said at least one electric input signal and to provide a processed signal in dependence thereof.

The method comprises that the machine learning model is trained (at least partially) with synthetic input data at least representing one or more, such as all of said external part of said at least one electric input signal;
said feedback part of said at least one electric input signal; and
said processed signal;

and is trained with synthetic output data at least representing
said feedback corrected version of the at least one electric input signal.

It is intended that some or all of the structural features of the device described above, in the 'detailed description of embodiments' or in the claims can be combined with embodiments of the method, when appropriately substituted by a corresponding process and vice versa. Embodiments of the method have the same advantages as the corresponding devices.

To avoid that the machine learning based system also learns the disadvantages of the current state-of-the-art feedback control systems (e.g. slow convergence, wrong reactions, etc.), it is proposed to train the machine learning based feedback control system with synthetic data (cf. e.g. signals v(n), x(n), y(n), e(n), p(n), and u(n) in FIG. 4) that would only be presented if there were a perfect feedback control system, e.g. where there is no need for decorrelation. The synthetic data should hence represent an ideal feedback system that e.g. would react to feedback path changes instantly without the need of a convergence period known from the adaptive filters. The training data may be generated with a view to minimizing artefacts in the output signal (cf. e.g. u(n) in FIG. 4) in connection with sudden changes of the feedback path.

The synthetic data may be generated by computer simulations. The at least one electric input signal may be the sum of the external part and the feedback part. The output training data are labeled data in the sense that they represent true output data for given input data.

In computer simulations, it is possible to have an "imaginary and perfect" feedback control always reacting instantly and accurately to feedback changes without suffering from the disadvantages from the current state-of-the-art feedback control systems, as the true acoustic feedback is known.

To provide the learning condition and data, an "imaginary and perfect" feedback control will be used to generate data for the training, both in static feedback situations and with dynamic feedback path changes. Using the generated data, a feedback control system will be trained. The input signals for the training may e.g. comprise white noise, speech, or music signals.

The synthetic output data may further represent the output signal (used as input to the output transducer).

The synthetic input data may further represent information about the one or more processing algorithms.

The synthetic output data may further represent parameters providing inputs to the one or more processing algorithms.

The method may provide that at least the synthetic output data are generated by computer simulation. The method may provide that at least at least some of the synthetic input data are generated by computer simulation.

The method may provide that at least the synthetic output data are generated by computer simulation to reflect an imaginary and perfect feedback control system reacting instantly and accurately to feedback changes.

The method may provide that the imaginary and perfect feedback control system is used to generate data for the training of the machine learning model, in static feedback situations as well as in dynamic feedback situations (with dynamic feedback path changes).

The method may provide that the input signals for training the machine learning model comprise white noise, or speech, or music signals, or a mixture thereof.

A Further Hearing Aid:

In a further aspect of the present application, a further hearing aid is provided. The further hearing aid comprises

- at least one input transducer for converting input sound in an environment around the user to at least one electric input signal representing said input sound;
- an output transducer for converting an output signal provided in dependence of said at least one electric input signal to stimuli perceivable to the user as sound;

wherein said input sound comprises an external sound and a feedback sound generated by said output transducer and leaked to said input transducer via feedback path, and wherein said at least one electric input signal likewise comprises an external part originating from said external sound and a feedback part originating from said feedback sound;

- a feedback control system for minimizing said feedback part of said at least one electric input signal and at least providing a feedback corrected version of said at least one electric input signal, the feedback control system comprising said machine learning model; and
- an audio signal processor configured to apply one or more processing algorithms to said feedback corrected version of said at least one electric input signal and to provide a processed signal in dependence thereof.

The machine learning model is trained according to the method described above, in the 'detailed description of embodiments' and in the claims.

A Computer Readable Medium or Data Carrier:

In an aspect, a tangible computer-readable medium (a data carrier) storing a computer program comprising program code means (instructions) for causing a data processing system (a computer) to perform (carry out) at least some (such as a majority or all) of the (steps of the) method described above, in the 'detailed description of embodiments' and in the claims, when said computer program is executed on the data processing system is furthermore provided by the present application.

By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Other storage media include storage in DNA (e.g. in synthesized DNA strands). Combinations of the above should also be included within the scope of computer-readable media. In addition to being stored on a tangible medium, the computer program can also be transmitted via a transmission medium such as a wired or wireless link or a network, e.g. the Internet, and loaded into a data processing system for being executed at a location different from that of the tangible medium.

A Computer Program:

A computer program (product) comprising instructions which, when the program is executed by a computer, cause the computer to carry out (steps of) the method described above, in the 'detailed description of embodiments' and in the claims is furthermore provided by the present application.

A Data Processing System:

In an aspect, a data processing system comprising a processor and program code means for causing the processor to perform at least some (such as a majority or all) of the steps of the method described above, in the 'detailed description of embodiments' and in the claims is furthermore provided by the present application.

A Hearing System:

In a further aspect, a hearing system comprising a hearing aid as described above, in the 'detailed description of embodiments', and in the claims, AND an auxiliary device is moreover provided.

The hearing system may be adapted to establish a communication link between the hearing aid and the auxiliary device to provide that information (e.g. control and status signals, possibly audio signals) can be exchanged or forwarded from one to the other.

The auxiliary device may comprise a remote control, a smartphone, or other portable or wearable electronic device, such as a smartwatch or the like.

The auxiliary device may be constituted by or comprise a remote control for controlling functionality and operation of the hearing aid(s). The function of a remote control may be implemented in a smartphone, the smartphone possibly running an APP allowing to control the functionality of the audio processing device via the smartphone (the hearing aid(s) comprising an appropriate wireless interface to the smartphone, e.g. based on Bluetooth or some other standardized or proprietary scheme).

The auxiliary device may be constituted by or comprise an audio gateway device adapted for receiving a multitude of audio signals (e.g. from an entertainment device, e.g. a TV or a music player, a telephone apparatus, e.g. a mobile telephone or a computer, e.g. a PC) and adapted for selecting and/or combining an appropriate one of the received audio signals (or combination of signals) for transmission to the hearing aid.

The auxiliary device may be constituted by or comprise another hearing aid. The hearing system may comprise two hearing aids adapted to implement a binaural hearing system, e.g. a binaural hearing aid system.

An APP:

In a further aspect, a non-transitory application, termed an APP, is furthermore provided by the present disclosure. The APP comprises executable instructions configured to be executed on an auxiliary device to implement a user interface for a hearing aid or a hearing system described above in the 'detailed description of embodiments', and in the claims. The APP may be configured to run on cellular phone, e.g. a smartphone, or on another portable device allowing communication with said hearing aid or said hearing system.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

FIG. 8A shows a first embodiment of a flow diagram of a method of training a machine learning model for use in a feedback control system of a hearing aid; and FIG. 8B shows a second embodiment of a flow diagram of a method of training a machine learning model for use in a feedback control system of a hearing aid.

The figures are schematic and simplified for clarity, and they just show details which are essential to the understanding of the disclosure, while other details are left out. Throughout, the same reference signs are used for identical or corresponding parts.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION OF EMBODIMENTS

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include micro-electronic-mechanical systems (MEMS), integrated circuits (e.g. application specific), microprocessors, microcontrollers, digital signal processors (DSPs), field programmable gate arrays (FPGAs), programmable logic devices (PLDs), gated logic, discrete hardware circuits, printed circuit boards (PCB) (e.g. flexible PCBs), and other suitable hardware configured to perform the various functionality described throughout this disclosure, e.g. sensors, e.g. for sensing and/or registering physical properties of the environment, the device, the user, etc. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The present application relates to the field of hearing devices, e.g. hearing aids, in particular to feedback control in such devices.

Modern machine learning techniques provide a new tool, which may deliver a completely new generation of feedback control systems, which can solve the biased estimation problem without compromising sound quality, and it can better handle critical feedback situations and hence better ensure that the optimal gain can be provided to the users.

Figure 1:
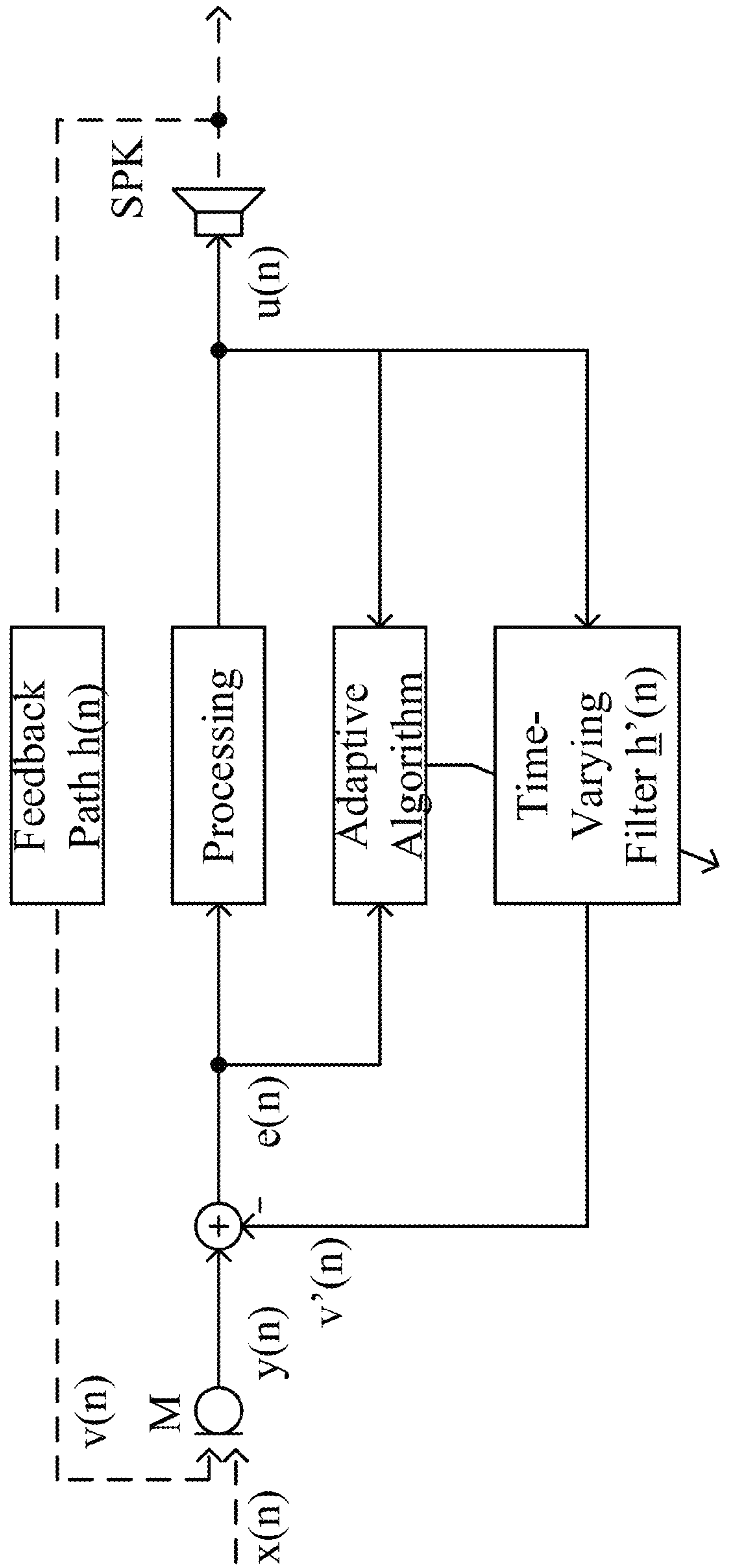
FIG. 1 shows a state-of-the-art feedback control system using an adaptive filter.

FIG. 1 shows a simplified block diagram of a hearing aid comprising a state-of-the-art feedback control system. The hearing aid is adapted to be located at or in an ear of a user. The hearing aid may be configured to compensate for a hearing loss of the user. The hearing aid comprises a forward path for processing an input signal representing sound in the environment (x(n), v(n), n representing time). The forward path comprises at least one input transducer (e.g. one or more microphones, here one microphone (M)) for picking up sound from the environment of the hearing aid and providing an electric input signal (y(n)). The forward path further comprises an audio signal processor (Processing) for processing a feedback corrected version (e(n)) of the electric input signal (y(n)) and providing a processed signal (u(n)) based thereon. The forward path further comprises an output transducer (SPK, e.g. a loudspeaker or a vibrator) for generating stimuli perceivable by the user as sound based on the processed signal (u(n)). The hearing aid further comprises a feedback control system for feedback control (e.g. attenuation or removal). The feedback control system comprises a feedback estimation unit (embodied as an adaptive filter) for estimating a current feedback path (Feedback Path h(n)) from the output transducer (SPK) to input transducer (M) (cf. acoustic input signal v(n) to the microphone (M)) and providing an estimate (v'(n)) thereof. The adaptive filter comprises an algorithm part (Adaptive algorithm) and variable filter part (Time Varying Filter $\underline{h}$'(n)). The algorithm part comprises an adaptive algorithm for providing update filter coefficients to the algorithm part in dependence of the feedback corrected version (e(n)) of the electric input signal (y(n)) and the output signal (u(n)). Based on the updated filter coefficients, the variable filter part provides the estimate (v'(n)) of the feedback path signal (v(n)) by filtering the output signal (u(n)). A further component of the feedback control system shown in FIG. 1 is a combination unit (her a summation unit, '+') for combining the electric input signal (y(n)) and the estimated feedback signal (v'(n)) provided by the adaptive filter (specifically by the filter part (Time Varying Filter $\underline{h}$'(n))). The feedback path estimate (v' (n)) is (here subtracted from input signal (y(n)) in summation unit (+), to provide the feedback corrected signal (e(n)).

For the feedback control purpose, the processing unit in the forward path typically consists of a decorrelation block, a gain control block, and optionally a fast feedback reduction block. This is illustrated in FIG. 2.

Figure 2:
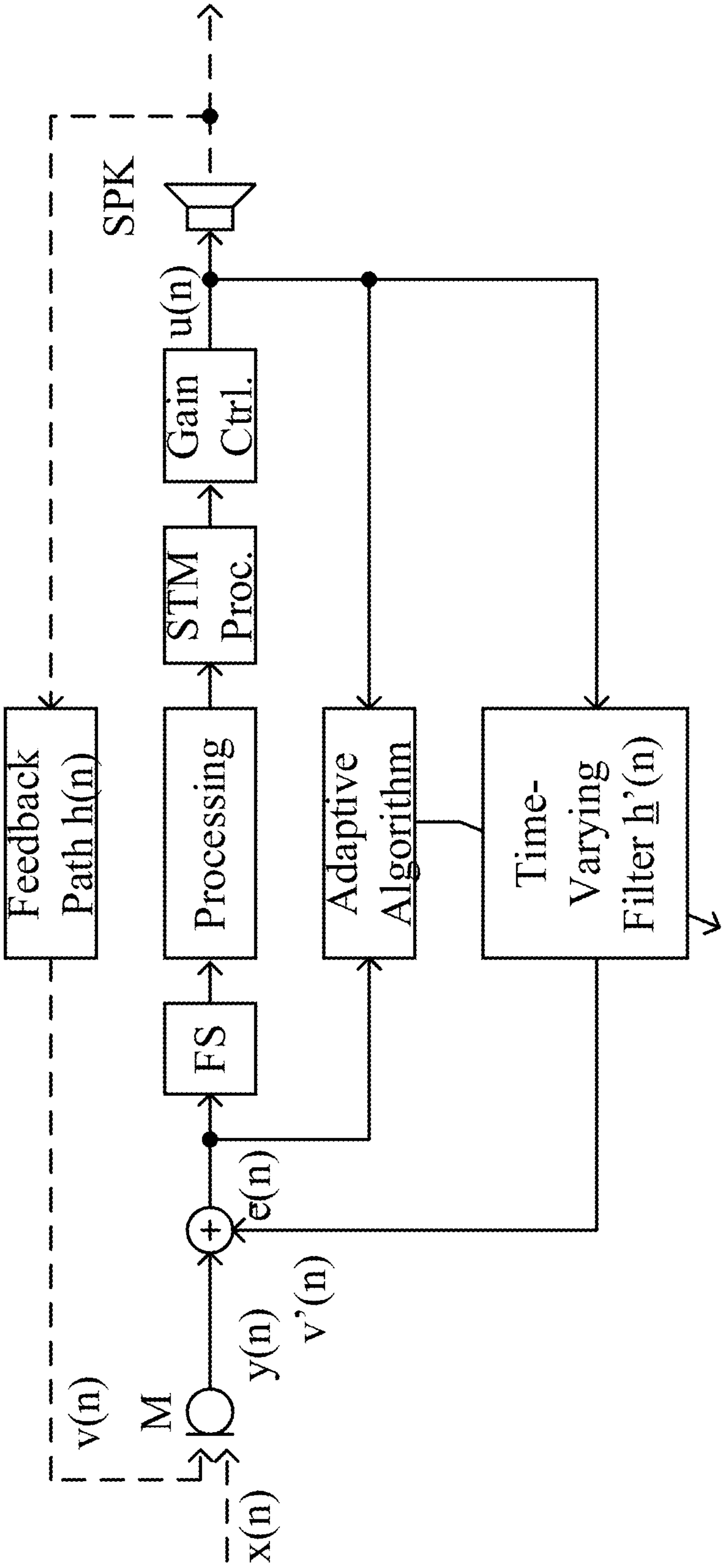
FIG. 2 shows examples of state-of-the-art forward path processing for feedback control purposes.

FIG. 2 shows examples of state-of-the-art forward path processing for feedback control purposes. In FIG. 2, the decorrelation method is implemented by an introduction of a frequency shift (cf. unit FS). Further a fast feedback reduction block (STM proc.) provides fast feedback reduction in case a risk of feedback is detected (cf. e.g. EP3139636A1, EP3291581A2). A further gain control block (Gain Ctrl.) may provide gain reduction in case a risk of feedback is detected. Together with the adaptive filter h'(n), they may form a state-of-the-art feedback control system.

Figure 3:
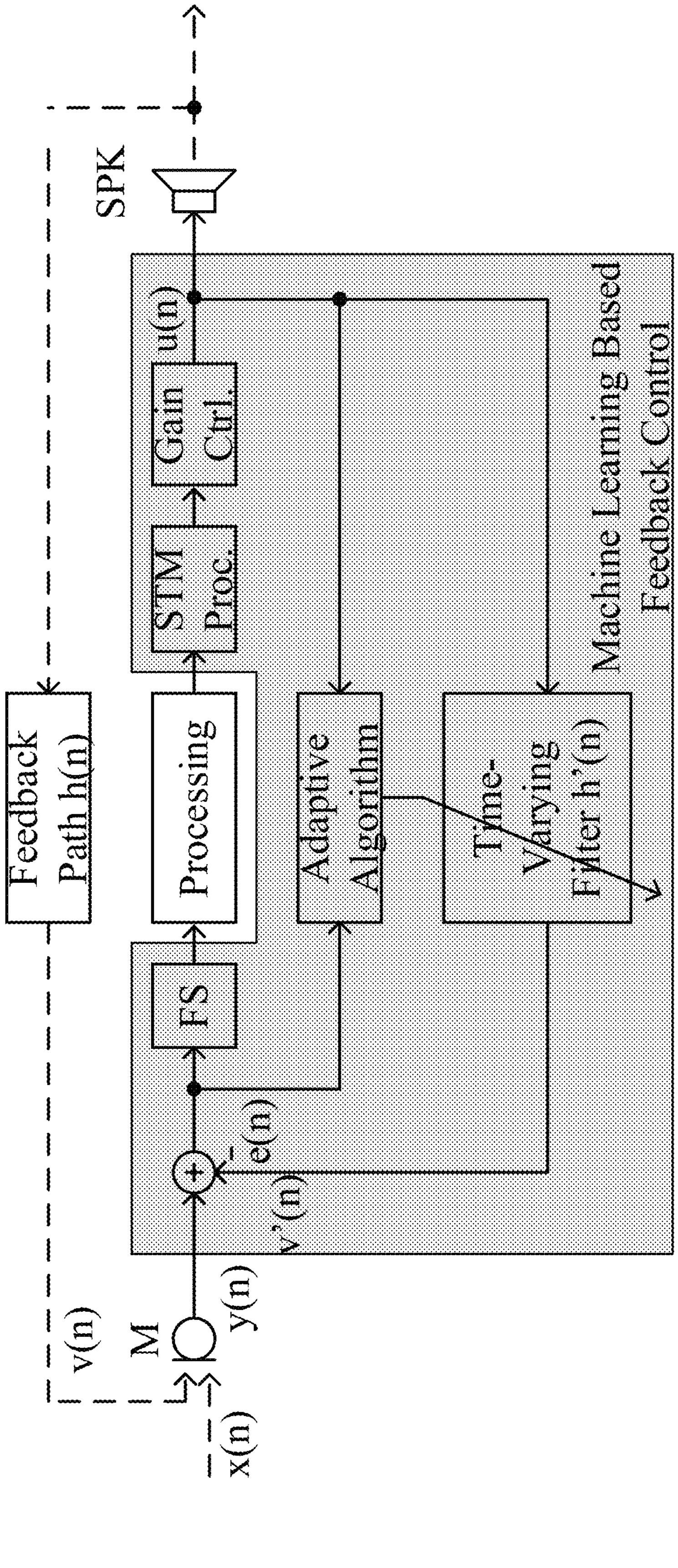
FIG. 3 shows a block diagram of a hearing device comprising a feedback control system according to the present disclosure.

In our envisioned future machine learning based feedback control system, we can in principle replace all these blocks with a machine learning block, as shown in FIG. 3.

FIG. 3 shows a block diagram of a hearing device comprising a feedback control system according to the present disclosure. The hatched blocks will be replaced by a machine learning based system. This new system can be redrawn into FIG. 4.

Figure 4:
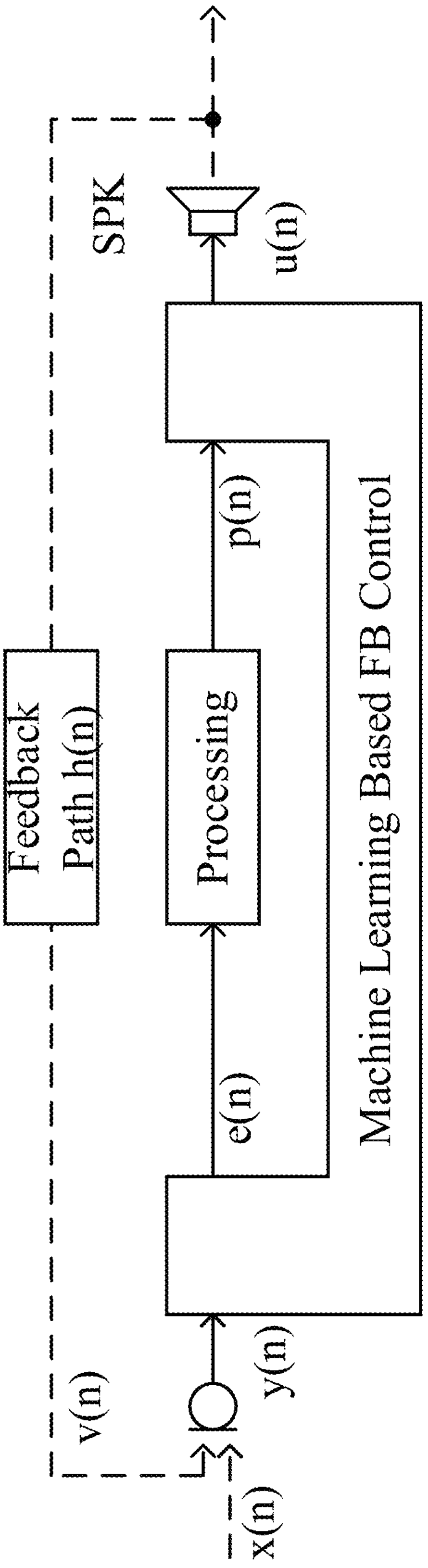
FIG. 4 shows a block diagram of a hearing device comprising a machine learning based feedback control system according to the present disclosure.

FIG. 4 shows a block diagram of a hearing device comprising a machine learning based feedback control system according to the present disclosure. This system shown in FIG. 4 is in principle capable of providing all the possible feedback control related opportunities as shown in the state-of-the-art system in FIG. 2, if we train the system in FIG. 4 using the real data captured from the system in FIG. 1. However, by doing that, the machine learning based system would also "learn" the disadvantages of the current state-of-the-art system.

As an alternative, it is proposed to train the machine learning based feedback control system with synthetic data v(n), x(n), y(n), e(n), p(n), and u(n), that would only be presented if there were a perfect feedback control system, i.e., there is no need for decorrelation, the feedback system would react to feedback path changes instantly without the need of a convergence period known from the adaptive filters.

Figure 5:
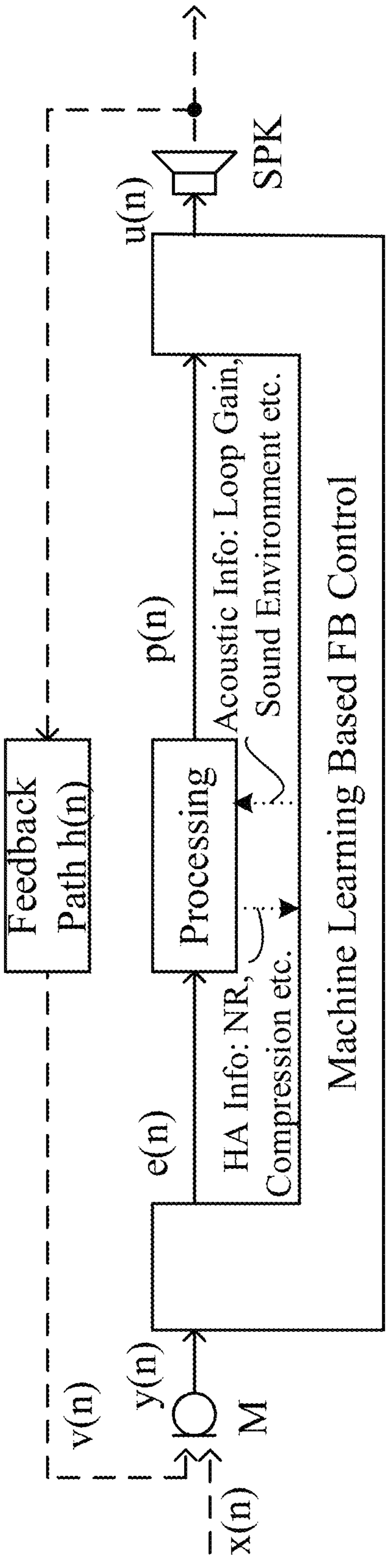
FIG. 5 shows a block diagram of a hearing device comprising a machine learning based feedback control system according to the present disclosure, wherein information from the hearing device processing unit is used as inputs to the machine learning based feedback control system, and acoustic information from the learning model are provided to the hearing aid processing unit.

Furthermore, it is proposed to provide more information from the hearing aid processing unit to the machine learning based feedback control system, to gain better performance, as illustrated in FIG. 5. This may e.g. be information about the noise reduction (NR), the compression including its gain, knee point, compression ratio, etc. On the other hand, it is also possible that the machine learning based feedback control system provides acoustic related information to the hearing aid processing, such as loop gain, current sound environment etc. which can all be trained together with the feedback control system.

FIG. 5 shows a block diagram of a hearing device comprising a machine learning based feedback control system according to the present disclosure, wherein information from the hearing device processing unit is used as inputs to the machine learning based feedback control system, and acoustic information from the learning model are provided to the hearing aid processing unit.

Figure 6:
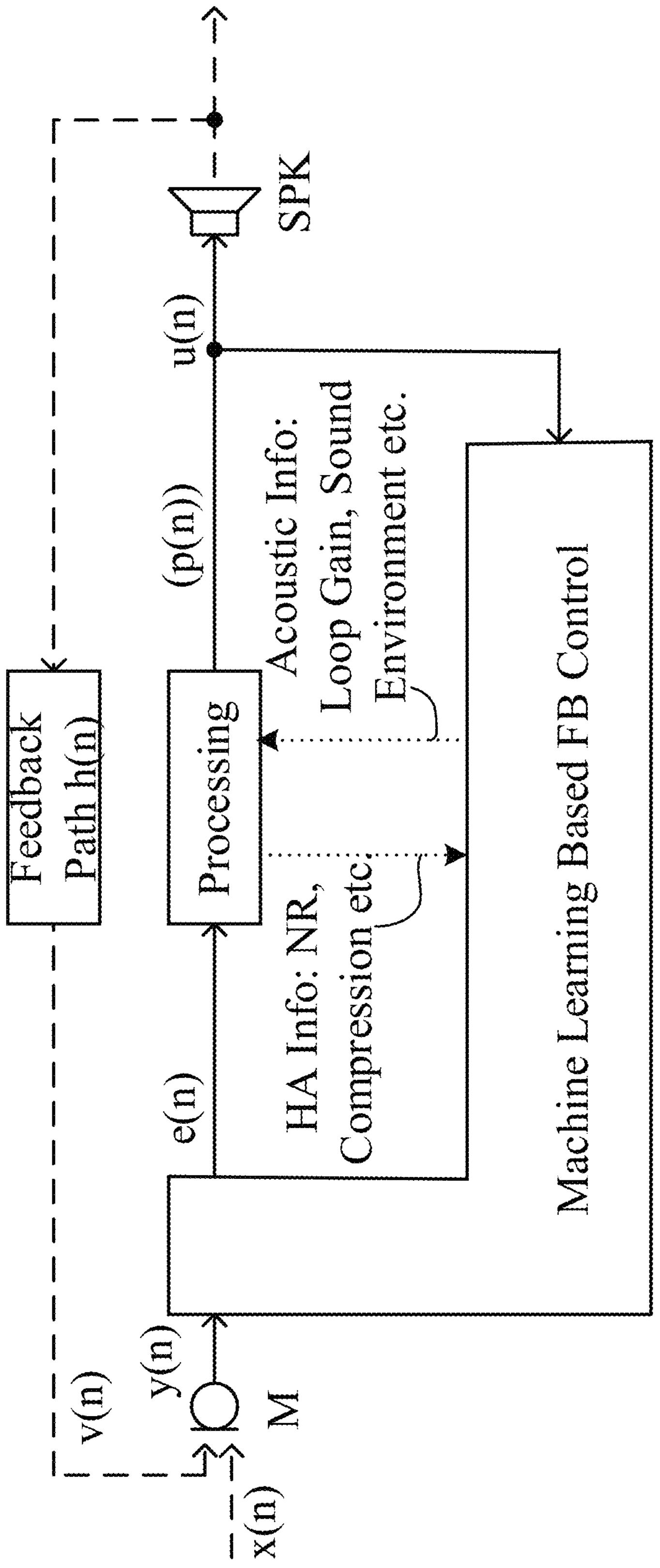
FIG. 6 shows a block diagram of a hearing device comprising a machine learning based feedback control system according to the present disclosure, wherein a simpler model comprising that the output signal u(n) is the input to the model is used, FIG. 7A schematically illustrates a first example of input and output vectors for a machine learning model according to the present disclosure.

A simpler model is shown in FIG. 6, in which the machine learning should only provide a feedback-free signal e(n).

FIG. 6 shows a block diagram of a hearing device comprising a machine learning based feedback control system according to the present disclosure, wherein a simpler model comprising that the output signal u(n) is the input to the model is used.

In this model, although it is possible (indirectly by modifying e(n)), it is not the intention that the model can modify the output signal u(n), as was the case in the previous model.

More details on how to train the machine learning model (as shown in FIG. 5.) are presented below.

We consider some standard algorithms for the machine learning training, such as the supervised learning method, one specific way of training such a model is backpropagation.

In this case, we would provide training signals generated from realistic computer simulations. In simulations, we have access to all signals, including the feedback signal v(n) and the incoming signal x(n), which are not observable in practice. We can then create the microphone signals y(n)=x (n)+v(n), and the desired processing signal p(n) depends on the chosen (and known) hearing aid processing, both y(n) and p(n) would be available to use (for us or our machine learning model) during the normal hearing aid operation.

Furthermore, we can generate the desired feedback compensated signal e(n) (ideally e(n)=x(n)), and the desired output signal u(n) (ideally u(n)=p(n)), both e(n) and u(n) are used as the reference signals (labeled data) for the training.

We would need to create many sets of the signals v(n), x(n), y(n) and p(n), e(n) and u(n) to train the network, under different conditions (signal type of x(n), dynamics of v(n), the processing of hearing aid to mention the most important ones).

We expect that the input signals to the machine learning network are the time-frequency units Y(k,l) and P(k,l) after the transformation (e.g., STFT) of the time domain signals y(n), p(n), where l and k are the time-frequency domain time and frequency indices.

Furthermore, we would have the time-domain signals e(n) and u(n), or their time-frequency transformed signals E(k,l) and U(k,l) as labeled data for our training.

In one setup, we would arrange Y(k,l'), P(k,l') as a K-element (column) vector $\underline{Y}_{l'}$ and $\underline{P}_{l'}$ for each time index m, where k=0, . . . , K−1. This is illustrated in FIG. 7A, 7B (with different output vectors).

In another setup, we would concatenate more K-element (column) vectors of $\underline{Y}_{l'}$, $\underline{P}_{l'}$ over several time indices l' into matrices $\underline{Y}_{l'}=[\underline{Y}_{l'}\underline{Y}_{l'-1}\ .\ .\ .\ ]$ and $\underline{P}_{l'}=[\underline{P}_{l'}\underline{P}_{l'-1}\ .\ .\ .\ ]$. This is illustrated in FIGS. 7C and 7D.

Figure 7A:
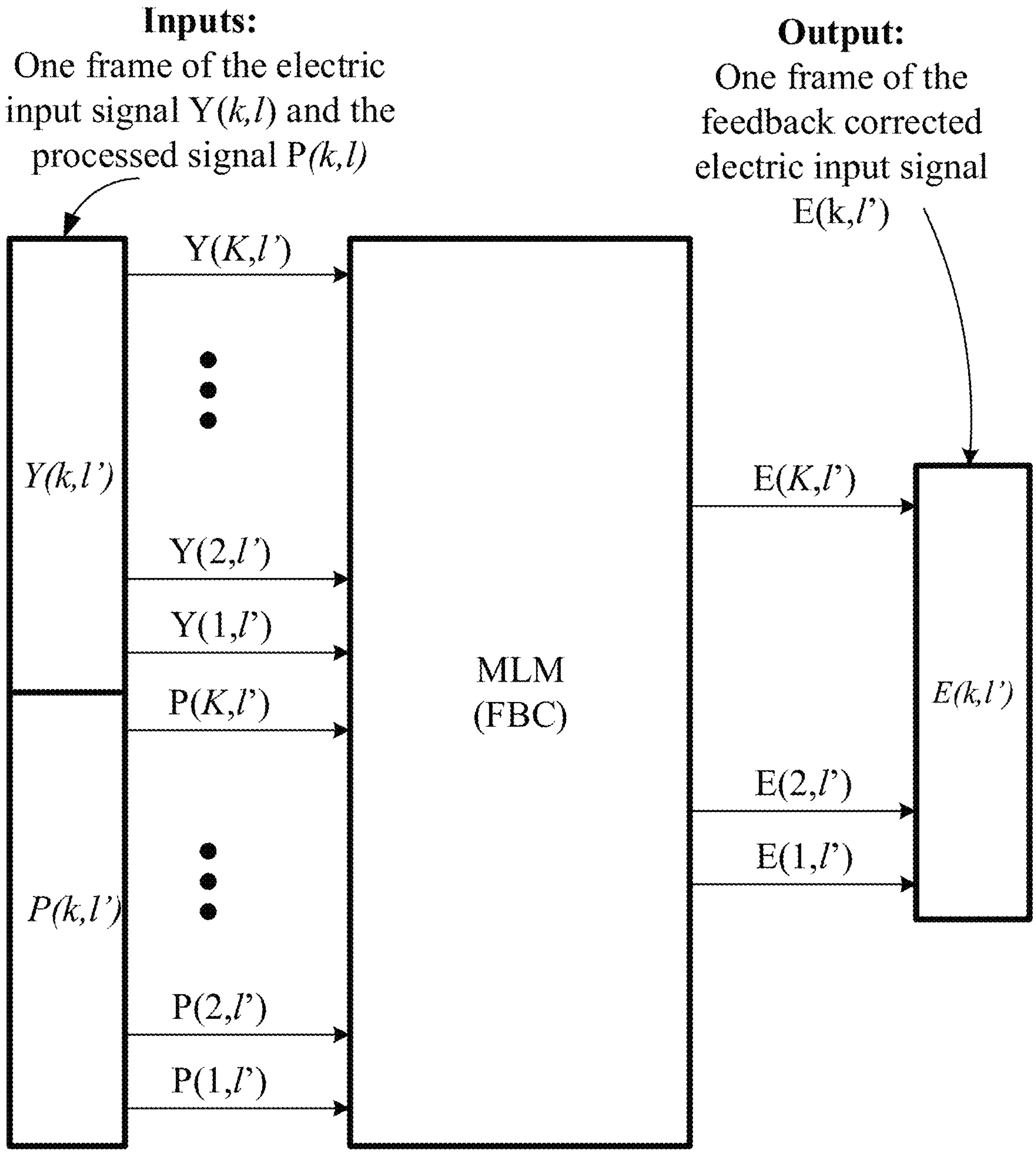
FIG. 7B schematically illustrates a second example of input and output vectors for a machine learning model according to the present disclosure.
FIG. 7C schematically illustrates an example of historic context of an input vector for a machine learning model according to the present disclosure.
FIG. 7D schematically illustrates an example of historic content of an input vector formed as concatenated individual vectors comprising data for a number of different input signals for a machine learning model according to the present disclosure and a corresponding output vector comprising concatenated individual vectors comprising data for a number of different output signals.

FIG. 7A schematically illustrates a first example of input and output vectors for a machine learning model (MLM (FBC)) according to the present disclosure. FIG. 7 is an example of input and output vectors that may be used in the embodiment of a hearing aid shown in FIG. 6. The input vector comprises concatenated column vectors of a single frame of the electric input signal (y(n)) (from microphone M) and of the processed signal (p(n)) (from audio signal processor (Processing)). Both input signals are converted to a time-frequency representation (Y(k,l), P(k,l), e.g. using respective analysis filter banks, e.g. applying Fourier transform algorithms (e.g. STFT) to the respective time domain signals (y(n), p(n)). Concatenated column vectors (Y(k,l), P(k,l) for a given time index l' are used as input vector to the machine learning model (MLM (FBC)), which provides a time frame E(k,l') of the feedback corrected signal (e(n)).

Figure 7B:
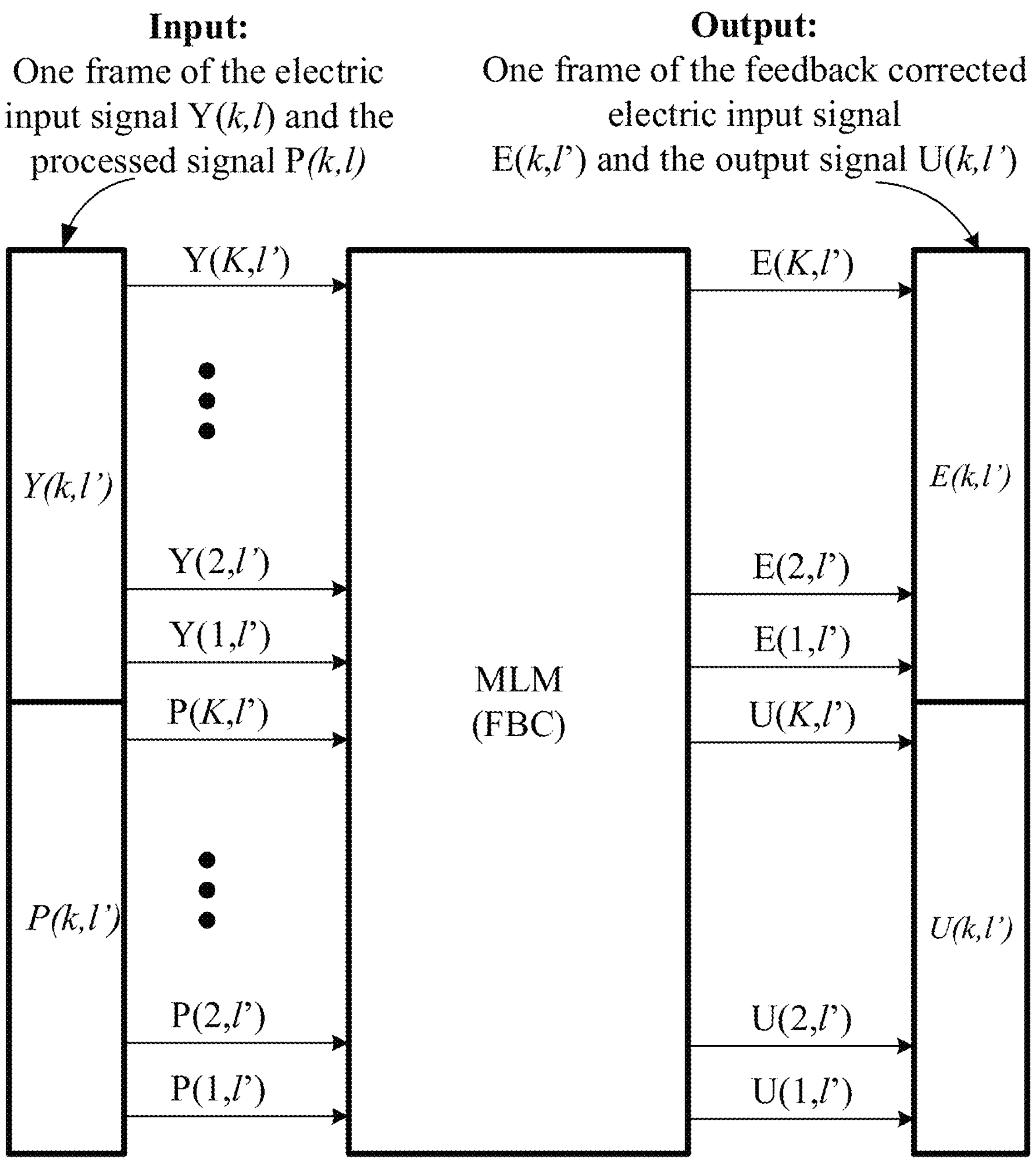

FIG. 7B schematically illustrates a second example of input and output vectors for a machine learning model according to the present disclosure. FIG. 7B is similar to FIG. 7A, but the output vector for the machine learning model additionally comprises a frame (U(k,l') representing the output signal (u(n)), which is fed to an output transducer (SPK) of the hearing device (see e.g. embodiments of a hearing devices of FIGS. 4 and 5).

Figure 7C:
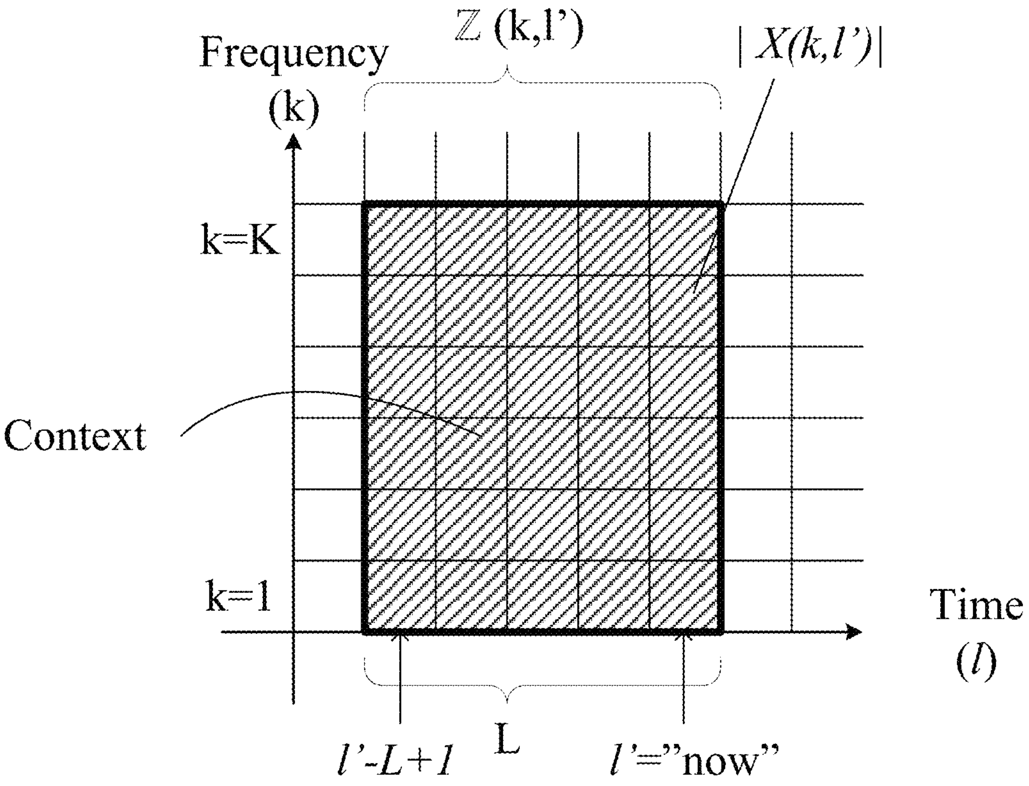
Figure 7D:
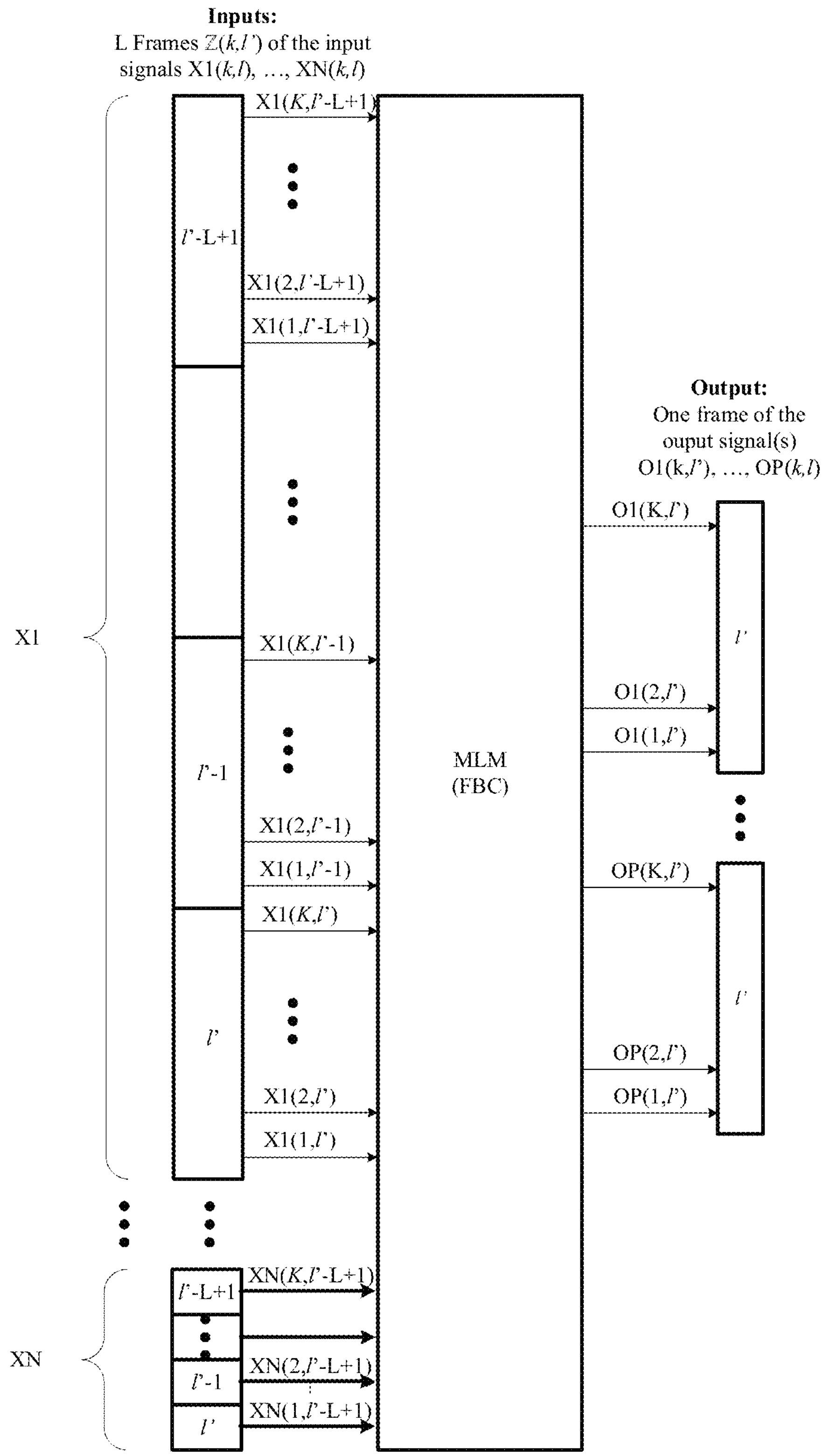

FIG. 7C schematically illustrates an example of historic context of an input vector for a machine learning model according to the present disclosure. FIG. 7C illustrates a part of a time-frequency 'map' for a given signal X represented by magnitudes (|X(k,l)|) of the signal X in each time frequency unit (k,l). The hearing device may comprise a context unit for providing an appropriate input vector Z(k,l') to the machine learning model (MLM (FBC)) to be trained, l' corresponding to a specific point in time (denoted 'now' in FIG. 7C). The context is illustrated in in FIG. 7C by hatched part of time-frequency map denoted 'Context'. These L time frames are included in the input vector for a given input signal (denoted X in FIG. 7C) to the model (input vector denoted Z(k,l')). The number of frames L may e.g. be fixed in advance of the training procedure, e.g. related to the timing of feedback howl build-up.

The (synthetic) training data preferably comprises a larger number of data sets leading to feedback howl (for a given hearing device, e.g. a specific hearing aid style), wherein the input and output and intermediate signals are known as described above.

FIG. 7D schematically illustrates an example of historic content of an input vector formed as concatenated individual vectors comprising data for a number of different input signals (X1, . . . , XN, N being the number of input signals) for a machine learning model (MLM (FBC)) according to the present disclosure and a corresponding output vector comprising concatenated individual vectors comprising data for a number of different output signals (O1, . . . , OP, P being the number of output signals from the model).

Similarly, we can arrange the information from the hearing aid processing (dotted line in FIG. 5) as vectors (with elements containing information over frequencies). Some examples of relevant and useful information can be the amount of noise reduction N(k,l) applied and the information about the applied gain G(k,l'), input signal level L(k,l'), etc., over different frequencies k at a given time l'. These values can also be concatenate to vectors and/or matrices.

An output (dotted line in FIG. 5) from the machine leaning model can be acoustic information, such as loop gain over frequencies, current sound environments etc. These can be trained as part of the supervised learning training.

Different types of networks may be used to train the machine learning model, such as a dense neural network, convolutional neural network, and recurrent neural network, e.g. a gated recurrent unit (GRU), or combinations thereof.

Another way of training the network may be to use the reinforcement learning method.

A method of training for machine learning model (e.g. implemented by a neural network) for use in a feedback control system of a hearing device, e.g. hearing aid, is proposed. This is illustrated in FIG. 8A. The training is performed by synthetic signals provided by a computer simulation of the hearing device, e.g. a hearing aid.

The synthetic input data may represent
- an external part of an electric input signal provided by an input transducer;
- a feedback part of the electric input signal propagated from an output transducer to the input transducer; and
- a processed signal provided by processing of a feedback corrected version of the electric input signal; and The synthetic output data may represent
- the feedback corrected version of the at least one electric input signal.

The synthetic output data may further represent an output signal provided to the output transducer for being presented to a user.

The synthetic input data may further represent information about one or more processing algorithms applied to feedback corrected version of the at least one electric input signal.

The synthetic output data may further represent parameters providing inputs to the one or more processing algorithms.

The training procedure may involve the use of one or more "loss functions" (or "cost functions"), i.e. functions to be optimized (e g minimized or maximized) during the training of the network. Many such functions could be envisioned, including:
- Mean-Squared Error (MSE) between complex STFTs of network compensated signal and ideal signal.
- MSEs of transformed STFTs, e.g., log-magnitude-STFTs.
- More perceptually oriented loss functions (e.g. speech intelligibility measures, e.g. Short-Time Objective Intelligibility (STOI), Speech Intelligibility Index (SII), Hearing Aid Speech Perception Index (HASPI), etc.).

FIG. 8B illustrates another embodiment of a method of training a machine learning model for use in a feedback control system of a hearing aid.

The hearing aid comprises at least one input transducer for converting input sound in an environment around the user to at least one electric input signal representing said input sound;

an output transducer for converting an output signal provided in dependence of said at least one electric input signal to stimuli perceivable to the user as sound;

wherein said input sound comprises an external sound and a feedback sound generated by said output transducer and leaked to said input transducer via feedback path, and wherein said at least one electric input signal likewise comprises an external part originating from said external sound and a feedback part originating from said feedback sound;

a feedback control system for minimizing said feedback part of said at least one electric input signal and at least providing a feedback corrected version of said at least one electric input signal; and an audio signal processor configured to apply one or more processing algorithms to said feedback corrected version of said at least one electric input signal and to provide a processed signal in dependence thereof.

The method comprises that the machine learning model is trained with synthetic input data at least representing said external part of said at least one electric input signal;

said feedback part of said at least one electric input signal; and said processed signal; and and with synthetic output data at least representing said feedback corrected version of the at least one electric input signal.

The synthetic output data may further represent an output signal provided to the output transducer for being presented to a user.

The synthetic input data may further represent information about one or more processing algorithms applied to feedback corrected version of the at least one electric input signal.

The synthetic output data may further represent parameters providing inputs to the one or more processing algorithms.

It is intended that the structural features of the devices described above, either in the detailed description and/or in the claims, may be combined with steps of the method, when appropriately substituted by a corresponding process.

Embodiments of the disclosure may e.g. be useful in electronic appliances, where acoustic feedback can be expected.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element, but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method are not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more.

REFERENCES

EP3139636A1 (Oticon, Bernafon) 8 Mar. 2017
EP3291581A2 (Oticon) 7 Mar. 2018
EP3236675A1 (Starkey) 25 Oct. 2017

The invention claimed is:

1. A hearing aid adapted for being worn by a user at or in an ear of the user, the hearing aid comprising at least one input transducer for converting sound in an environment around the user to at least one electric input signal representing said sound;

an output transducer for converting an output signal provided in dependence of said least one electric input signal to stimuli perceivable to the user as sound;

a feedback control system configured to minimize feedback from said output transducer to said at least one input transducer, and to at least provide a feedback corrected version of said at least one electric input signal; and an audio signal processor configured to apply one or more processing algorithms to said feedback corrected version of said at least one electric input signal, and to provide a processed signal in dependence thereof;

wherein the feedback control system is based on a machine learning model receiving input data at least representing said at least one electric input signal; and said processed signal;

wherein the feedback control system is configured to provide said feedback corrected version of the at least one electric input signal as an output; and wherein the machine learning model is trained with synthetic input data, at least some of the synthetic input data having been generated by computer simulation, the synthetic input data at least representing an external part of said at least one electric input signal;
an feedback part of said at least one electric input signal; and
said processed signal; and with synthetic output data at least representing
said feedback corrected version of the at least one electric input signal.

2. A hearing aid according to claim 1 wherein said feedback control system is configured to provide said output signal as a further output.

3. A hearing aid according to claim 1 wherein said machine learning model is configured to receive further input data representing information about said one or more processing algorithms.

4. A hearing aid according to claim 1 wherein said feedback control system is configured to provide a control input signal to the audio signal processor as a further output, said control input signal comprising parameters providing inputs to said one or more processing algorithms.

5. A hearing aid according to claim 1 wherein said machine learning model is trained with input data at least representing
said at least one electric input signal; and
said processed signal.

6. A hearing aid according to claim 5 wherein said machine learning model is trained with further input data representing information about said one or more processing algorithms.

7. A hearing aid according to claim 1 wherein said processed signal from the processor provides said output signal.

8. A hearing aid according to claim 1 being constituted by or comprising an air-conduction type hearing aid, a bone-conduction type hearing aid, or a combination thereof.

9. A hearing aid according to claim 1 comprising at least one analysis filter bank for providing said at least one electric input signal in a time-frequency domain representation.

10. A hearing aid according to claim 9 wherein the input data to the machine learning model are
said at least one electric input signal; and
said processed signal, which for each time index/each are arranged as a vector with K elements, K being the number of frequency bands in the time-frequency domain representation (k,l).

11. A hearing aid according to claim 1 wherein the output transducer comprises a) a loudspeaker for providing said stimuli as an acoustic signal to the user, or b) a vibrator for providing said stimuli as mechanical vibration of a skull bone to the user.

12. A method of training a machine learning model for use in a feedback control system of a hearing aid, the hearing aid comprising
at least one input transducer for converting input sound in an environment around the user to at least one electric input signal representing said input sound;
an output transducer for converting an output signal provided in dependence of said at least one electric input signal to stimuli perceivable to the user as sound;

wherein said input sound comprises an external sound and a feedback sound generated by said output transducer and leaked to said input transducer via feedback path, and wherein said at least one electric input signal likewise comprises an external part originating from said external sound and a feedback part originating from said feedback sound;

a feedback control system for minimizing said feedback part of said at least one electric input signal and at least providing a feedback corrected version of said at least one electric input signal, the feedback control system comprising said machine learning model; and
an audio signal processor configured to apply one or more processing algorithms to said feedback corrected version of said at least one electric input signal and to provide a processed signal in dependence thereof;

wherein the machine learning model is trained with synthetic input data, at least some of the synthetic input data having been generated by computer simulation, the synthetic input data at least representing
said external part of said at least one electric input signal;
said feedback part of said at least one electric input signal; and
said processed signal; and with synthetic output data at least representing
said feedback corrected version of the at least one electric input signal.

13. A method according to claim 12 wherein said synthetic output data further represents said output signal.

14. A method according to claim 12 wherein said synthetic input data further represents information about said one or more processing algorithms.

15. A method according to claim 12 wherein said synthetic output data further represents parameters providing inputs to said one or more processing algorithms.

16. A method according to claim 12 wherein at least said synthetic output data are generated by computer simulation.

17. A method according to claim 12 wherein at least said synthetic output data are generated by computer simulation to reflect an imaginary feedback control system reacting instantly and accurately to feedback changes.

18. A method according to claim 12 wherein an imaginary feedback control system is used to generate data for the training of the machine learning model, both in static feedback situations and with dynamic feedback path changes.

19. A method according to claim 12 wherein the input signals for the training of the machine learning model comprise white noise, or speech, or music signals, or a mixture thereof.

20. A hearing aid comprising
at least one input transducer for converting input sound in an environment around the user to at least one electric input signal representing said input sound;
an output transducer for converting an output signal provided in dependence of said at least one electric input signal to stimuli perceivable to the user as sound;

wherein said input sound comprises an external sound and a feedback sound generated by said output transducer and leaked to said input transducer via feedback path, and wherein said at least one electric input signal likewise comprises an external part originating from said external sound and a feedback part originating from said feedback sound;

a feedback control system for minimizing said feedback part of said at least one electric input signal and at least providing a feedback corrected version of said at least one electric input signal, the feedback control system comprising said machine learning model; and
an audio signal processor configured to apply one or more processing algorithms to said feedback corrected version of said at least one electric input signal and to provide a processed signal in dependence thereof;

wherein the machine learning model is trained according to the method of claim 12.

* * * * *